United States Patent [19] [11] Patent Number: 4,900,630
Suzuki et al. [45] Date of Patent: Feb. 13, 1990

[54] GLASS PLATE WITH REFLECTIVE MULTILAYER COATINGS TO GIVE GOLDEN APPEARANCE

[75] Inventors: Junichi Suzuki, Matsusaka; Masato Nakamura, Mie; Nobuyuki Takeuchi, Ise; Yasunobu Iida, Matsusaka; Hiroyuki Nishii, Ise, all of Japan

[73] Assignee: Central Glass Company, Limited, Ube, Japan

[21] Appl. No.: 199,178

[22] Filed: May 26, 1988

[30] Foreign Application Priority Data

May 29, 1987 [JP] Japan ................. 62-131283

[51] Int. Cl.$^4$ ............................................. C03C 17/22
[52] U.S. Cl. ..................... 428/432; 428/701; 428/702; 428/699
[58] Field of Search ............... 428/426, 432, 435, 698, 428/699, 701, 702, 34, 38, 334

[56] References Cited

U.S. PATENT DOCUMENTS 4,450,201  5/1984  Brill et al. ................. 428/432 X
4,640,867  2/1987  Oyama et al. ................. 428/432

FOREIGN PATENT DOCUMENTS 0220294  3/1985  German Democratic Rep. ................. 428/432
0224839  7/1985  German Democratic Rep. ................. 428/432
0054642  3/1984  Japan ................. 428/432
0141647  7/1985  Japan ................. 428/432

Primary Examiner—Nancy A. B. Swisher
Attorney, Agent, or Firm—Fleit, Jacobson, Cohn, Price, Holman & Stern

[57] ABSTRACT

A multilayer coating film is provided on one side of a transparent or semitransparent glass plate to afford a golden appearance to the coated glass plate at least when viewed from the uncoated side. Essentially the multilayer coating film is made up of a TiN layer adjacent to the glass plate surface and either a Ti layer or a Cr layer which overlies the TiN layer, and the coating film is formed such that the transmittance of the coated glass plate for visible light becomes not more than 40%. Optionally, the Ti or Cr layer is overlaid with either a $TiO_2$ film or a $Cr_2O_3$ film. Also optionally, either a $TiO_2$ film or a $Cr_2O_3$ film is interposed between the TiN layer and the glass plate surface. Each layer of the multilayer coating film can be formed by sputter deposition using a relatively simple method, an the multilayer coating has good durability.

8 Claims, 2 Drawing Sheets

GLASS PLATE WITH REFLECTIVE MULTILAYER COATINGS TO GIVE GOLDEN APPEARANCE

BACKGROUND OF THE INVENTION

This invention relates to a glass plate having on one side thereof a reflective multilayer coating, which includes a TiN layer, in order that the glass plate should assume a golden appearance at least when viewed from the opposite side. The coated glass plate is useful, for example, as a building material or an ornamental material.

Glass plates are often coated with a metal or metal compound for light or heat reflecting purposes and also for coloring purposes. To afford a golden appearance to a glass plate the simplest method is providing a coating film of Au, but this method is very costly. A long known substitute is a multilayer coating using Ag and Cu, but this coating is not very satisfactory in its hue and durability.

It is known that golden appearance can be afforded to a glass plate by using TiN as a coating material. However, TiN coating films on glass plates are significantly variable in color according to the coating method and coating conditions. For example, JP No. 47-14820 which relates to solar radiation reflcting glass plates gives an example wherein a TiN coating film deposited by high-frequency sputtering assumed a greenish color by reflection. Besides, it is not easy to provide a glass plate with a TiN coating film of good quality particularly in respect of adhesion strength and durability. According to JP-A No. 60-43481, an improved TiN coating film of a golden hue can be formed on a glass plate by using a special sputtering method characterized by passing the sputtered particles through a high-frequency plasma thereby exciting particles. However, this method entails a special sputtering apparatus and complicated operations and, nevertheless, the coating film may not satisfactory in durability. According to JP-A No. 60-187671, a two-layer coating made up of an inner layer of $TiO_2$ and an outer layer of TiN or a three-layer coating including another $TiO_2$ layer on the TiN layer is formed on a glass plate by carrying out sequential reactive sputtering in a vacuum chamber containing at least two targets of titanium for forming the inner $TiO_2$ layer and the TiN layer, respectively, and a mixed gas of argon, oxygen and nitrogen. This method is very complicated.

SUMMARY OF THE INVENTION

It is an object of the present invention to provide a glass plate having a multilayer coating which includes a TiN layer, gives a golden appearance by reflection, is sufficient in adhesion strength and durability and can be formed by using an ordinary sputtering method.

A coated glass plate according to the invention uses a transparent or semitransparent glass plate and has a reflective multilayer coating film on one side of the glass plate. The multilayer coating film comprises a TiN layer, and, as the principal feature of the invention, either a Ti layer or a Cr layer directly overlies the TiN layer. If desired the TiN layer may be doubly overlaid with a Ti layer and a Cr layer. The coated glass layer is required to be not more than 40% in transmittance for visible light.

A coated glass plate according to the invention assumes a good golden appearance when viewed from the uncoated side, and in some cases also when viewed from the coated side. Both the TiN layer and the overlying Ti or Cr layer are formed by an ordinary sputtering method. The Ti or Cr layer strongly adheres to the underlying TiN layer and affords sufficiently high durability and wear resistance to the multilayer coating.

Furthermore, the addition of the Ti or Cr layer to the TiN layer is effective for improving the golden hue of the coated glass plate viewed from the opposite side. That is, coated glass plates according to the invention possess such spectral characteristics that the reflectance curve rises toward the longer wavelength side and exhibits a particularly sharp rise in the 500–700 nm range of the wavelength. In other words, the spectral characteristics of these coated glass plates are close to the spectral characteristics of a film of Au sputter deposited onto a glass plate. The golden hue of the coated glass is controllable by using a color glass plate and also by varying the thickness of, for example, the TiN layer in the multilayer coating.

Optionally, the Ti or Cr layer of the multilayer coating according to the invention may be overlaid with a metal oxide layer, which is of either $TiO_2$ or $Cr_2O_3$ and serves the purpose of further enhancing mechanical strength and chemical resistance, to both acid and alkali, of the multilayer coating. Also optionally, the multilayer coating may include a base layer which interposes between the TiN layer and the glass plate surface and is formed of either $TiO_2$ or $Cr_2O_3$.

Coated glass plates according to the invention have wide uses and can be used as interior and exterior decorative or ornamental materials in general buildings and shops. The coated glass plates assume a brilliant golden appearance when installed so as to be viewed from the uncoated side, and in every use the multilayer coating exhibits excellent durability.

DESCRIPTION OF THE PREFERRED EMBODIMENTS

The glass plate for use in this invention must be transparent or semitransparent. As long as this condition is met, it is possible to use a color glass plate. The thickness of the glass plate is not limited and does not significantly affect the hue of the coated glass plate.

Figure 1:
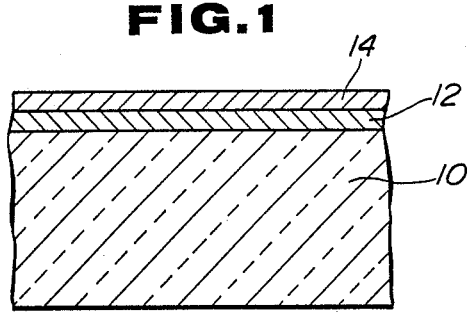
FIG. 1 is a fragmentary and explanatorily enlarged sectional view of a glass plate having a two-layer coating as an embodiment of the present invention.

FIG. 1 shows the simplest construction of the multilayer coating according to the invention. In this case the coating is made up of a TiN film 12 sputter deposited on one surface of a glass plate 10 and a film 14 of Ti or Cr sputter deposited on the TiN film 12.

The sputtering operation to form the TiN film 12 uses a Ti target and is carried out in the presence of a mixed gas of argon and nitrogen. It is suitable to determine the mixing ratio of Ar gas to $N_2$ gas within the range from 70:30 to 98:2 by volume. Addition of up to about 5% of hydrogen gas to the mixed gas is effective for further improvement on the hue of the deposited TiN film 12.

Neither the total thickness of the two-layer coating nor the thickness of each of the two layers 12 and 14 is strictly limited. Usually the thickness of each layer 12, 14 is from about 100 to about 2000 Å. In this invention it is essential that the transmittance of the coated glass plate for visible light should not exceed 40%. If the transmittance is more than 40% the multilayer coating will be too thin and, therefore, will possibly be nonuniform in thickness, which becomes a cause of unevenness of the hue and degradation of coating in durability. The transmittance of the multilayer coating depends more on the thickness of the Ti or Cr layer 14 than on the thickness of the TiN layer 12. Accordingly it is suitable to control the transmittance by varying the thickness of the Ti or Cr layer 14. On the other hand, the thickness of the TiN layer 12 considerably affects the hue of the multilayer coating and the tone of the color which the coated glass plate viewed from the uncoated side assumes. It is preferable that the transmittance of the coated glass plate for visible light is not more than 20%, and it is best that the transmittance is about 10%.

Figure 2:
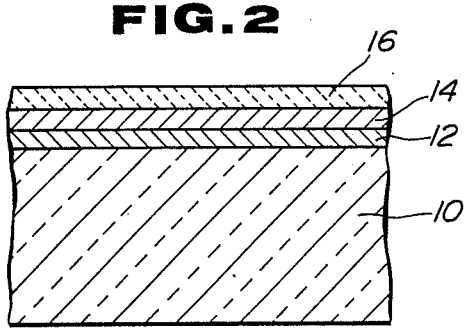
FIG. 2 shows, in a similar view, addition of a surface layer of a metal oxide to the two-layer coating of FIG. 1.
Figure 3:
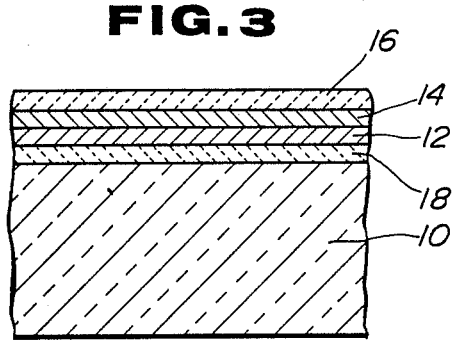
FIG. 3 shows, in a similar view, addition of another oxide layer to the three-layer coating of FIG. 2.

Referring to FIG. 2, it is optional and rather preferable to overlay the Ti or Cr layer 14 of the above described two-layer coating with a film 16 of either $TiO_2$ or $Cr_2O_3$. The oxide film 16 can be formed by sputtering Ti or Cr in the presence of a mixed gas of argon and oxygen. Referring to FIG. 3, another film 18 of $TiO_2$ or $Cr_2O_3$ may be interposed between the TiN film 12 and the glass plate surface. FIG. 3 shows the addition of this oxide film 18 to the three-layer coating shown in FIG. 2, but it is also optional to underlay the TiN film 12 of the two-layer coating of FIG. 1 with a $TiO_2$ or $Cr_2O_3$ film.

The invention is further illustrated by the following nonlimitative examples.

EXAMPLE 1

In this example, a two-layer coating shown in FIG. 1 was formed on a transparent and colorless glass plate 10. The glass plate was 3 mm in thickness and 600 mm×600 mm in widths.

The glass plate was washed with a neutral detergent, rinsed with water and further washed with isopropyl alcohol and dried. Then the glass plate was placed in a vacuum chamber of a DC magnetron reactive sputtering apparatus so as to face a target of Ti of more than 99.9% purity. The interior of the chamber was depressurized to below $5\times10^{-5}$ Torr. Then a mixed gas of Ar and $N_2$ in the proportion 80/20 to 90/10 by volume was introduced into the chamber to maintain the degree of vacuum in the chamber at about $3\times10^{-3}$ Torr. Under such condition the Ti target was sputtered such that a TiN film 12 deposited on the glass plate surface at a growth rate of about 8 Å/sec. The sputtering was carried out until the thickness of the deposited TiN film reached about 300 Å. After that the Ar-$N_2$ gas atmosphere in the chamber was replaced by Ar gas while the degree of vacuum was maintained at about $3\times10^{-3}$ Torr. Then the Ti target was again sputtered to depostit a Ti film 14 on the TiN film 12 at a growth rate of about 9 Å/sec until the thickness of the Ti film reached about 900 Å.

Figure 4:
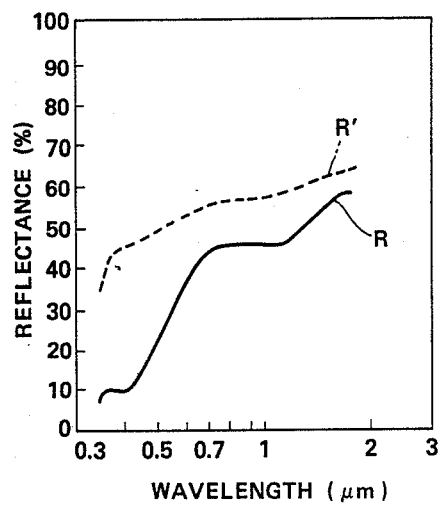
FIGS. 4 to 6 are charts showing spectral characteristics of three examples of coated glass plates according to the invention, respectively.

The glass plate having the two-layer coating formed by the above operations assumed a golden appearance when viewed from the uncoated side and a silvery appearance when viewed from the coated side. FIG. 4 shows spectral characteristics of the coated glass plate. The curve R represents reflectance of the coated glass plate for light incident on the uncoated surface of the coated glass plate, and the curve R' reflectance for light incident on the surface of the two-layer coating. The coated glass plate was regarded as opaque to visible light since transmittance was neary 0% over the visible range of wavelength.

EXAMPLE 2

In this example a three-layer coating as shown in FIG. 2 was formed on a transparent and colorless glass plate 3 mm in thickness and 800 mm×800 mm in widths.

The glass plate was cleaned by the same process as in Example 1 and placed in the vacuum chamber of a RF reactive sputtering apparatus so as to face a Ti target. The interior of the chamber was depressurized to below $5\times10^{-5}$ Torr, and a mixed gas of Ar and $N_2$ in the proportion of 70/30-95/5 by voluem was introduced into the chamber so as to maintain the degree of vacuum at about $3\times10^{-3}$ Torr. Under such condition the Ti target was sputtered to deposit a TiN film 12 on the glass plate surface at a growth rate of about 8 Å/sec until the thickness of the TiN film reached about 400 Å. Then the Ar-$N_2$ mixed gas was replaced by Ar gas while the degree of vacuum was maintained at about $3\times10^{-3}$ Torr, and the Ti target was sputtered to deposit a Ti film 14 on the TiN film at a growth rate of about 9 Å/sec until the thickness of the Ti film reached about 400 Å. Next, the Ar gas was replaced by a mixed gas of Ar and $O_2$ in the proportion of about 50/50 by volume while the degree of vacuum was maintained at about $3\times10^{-3}$ Torr. Under such condition, a reactive sputtering operation was made to deposit a $TiO_2$ film 16 on the Ti film 14 at a growth rate of about 1.5 Å/sec until the thickness of the oxide film reached about 200 Å.

Figure 5:
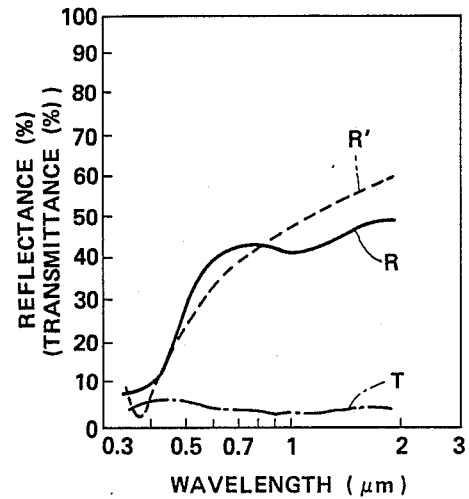

The coated glass plate obtained by the above operations assumed a golden appearance when viewed from the uncoated side and also when viewed from the opposite side. FIG. 5 shows spectral characteristics of the coated glass plate. The curve R represents reflectance for light incident on the uncoated surface of the coated glass plate, and the curve R' reflectance for light incident on the surface of the three-layer coating. The curve T represents transmittance of the coated glass plate. As can be seen the transmittance was about 7% at the maximum and about 5% on an average over the visible range of wavelength.

EXAMPLE 3

Figure 6:
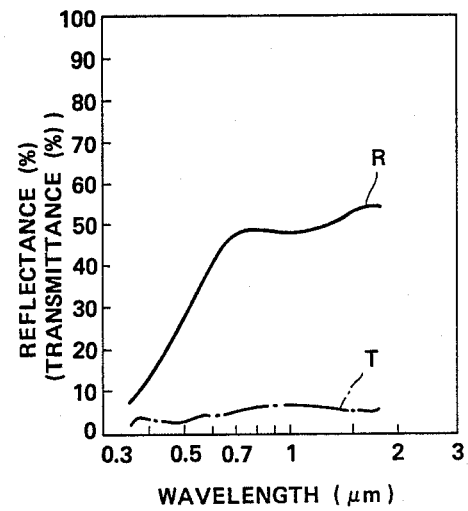

The operations in Example 2 were repeated to form a three-layer coating of similar construction except that the thicknesses of the respective layers were differently controlled. In this example each of the TiN film 12 and the Ti film 14 had a thickness of about 300 Å and the $TiO_2$ film 16 about 800 Å. The coated glass plate assumed a golden appearance when viewd from the uncoated side and a silvery blue appearance when viewed from the opposite side. FIG. 6 shows spectral characteristics of the coated glass plate. The curve R represents reflectance for light incident on the uncoated glass surface of the coated glass plate, and the curve T transmittance of the coated glass plate. Compared with the coated glass plate of Example 2, the coated glass plate of Example 3 was slightly higher in reflectance and nearly equivalent in transmittance.

EXAMPLES 4 AND 5

In these examples the TiN/Ti/TiO$_2$ coating described in Example 2 was differently modified in the thickness of the TiO$_2$ layer 16. In both Examples 4 and 5, each of the TiN film 12 and the Ti film 14 had a thickness of about 400 Å. The thickness of the TiO$_2$ film 16 was about 800 Å in Example 4 and about 400 Å in Example 5. In both Examples 4 and 5 the coated glass plate assumed a golden appearance when viewed from the uncoated side. When viewed from the opposite side the coated glass plate of Example 4 was of a bluish hue and that of Example 5 was of a purplish hue.

EXAMPLE 6

A four-layer coating as shown in FIG. 3 was formed by adding a base coating film 18 of TiO$_2$ to the three-layer coating of Example 5. The inner TiO$_2$ film 18 was about 50 Å in thickness. The coated glass plate assumed a golden appearance when viewed from the uncoated side and also when viewed from the opposite side.

EXAMPLE 7

The TiN/Ti coating of Example 1 was modified by using Cr as the material of the outer layer 14 in place of Ti. There was no change in the thicknesses of the respective layers. The change of the Ti film to the Cr film did not produce a significant change in the hue of the coated glass plate viewed from either the coated side or the uncoated side.

EXAMPLES 8 AND 9

In these examples the TiN/Ti/TiO$_2$ coating of Example 2 was differently modified in the material of the middle layer 14 and/or the outer layer 16.

In both Examples 8 and 9 the Ti film 14 in Example 2 was replaced by a Cr film of the same thickness. In Example 8 the TiO$_2$ film 16 was replaced by a Cr$_2$O$_3$ film having a thickness of about 800 Å. In Example 9 the thickness of the TiO$_2$ film 16 was increased to about 400 Å from about 200 Å in Example 2. These modification did not produce a significant change in the hue of the coated glass plate viewed from either the coated side or the uncoated side.

EXAMPLE 10

The TiN/Ti/TiO$_2$ coating of Example 3 was modified by replacing the TiO$_2$ film 16 by a Cr$_2$O$_3$ film of the same thickness. The modification did not produce a significant change in the hue of the coated glass plate viewed from either the coated side or the uncoated side.

COMPARATIVE EXAMPLE 1

In the vacuum chamber of a RF sputtering apparatus a target of Au was sputtered to deposit a Au film on a surface of a 3-mm thick transparent glass plate cleaned in advance by the same process as in Example 1. The Au film was formed to a thickness of about 2000 Å.

The thus coated glass plate assumed a golden appearance. Spectral characteristics of the gold coated glass plate were shown in FIG. 7, wherein the curve R(1) represent reflectance for light incident on the uncoated surface of the coated glass plate and the curve R(1)' reflectance for light incident on the Au coating film.

COMPARATIVE EXAMPLE 2

A 3-mm thick transparent and colorless glass plate was cleaned by the same process as in Example 1 and placed in the vacuum chamber of a DC magnetron sputtering apparatus so as to face a target of Ti. The interior of the chamber was evacuated, and a mixed gas of Ar and N$_2$ in the proportion of about 50/50 by volume was introduced into the chamber so as to maintain the degree of vacuum at about $3 \times 10^{-3}$ Torr. Under such condition the Ti target was sputtered to deposit a TiN film on the glass plate surface to a thickness of about 300 Å. No additional film was formed on the TiN film.

Figure 7:
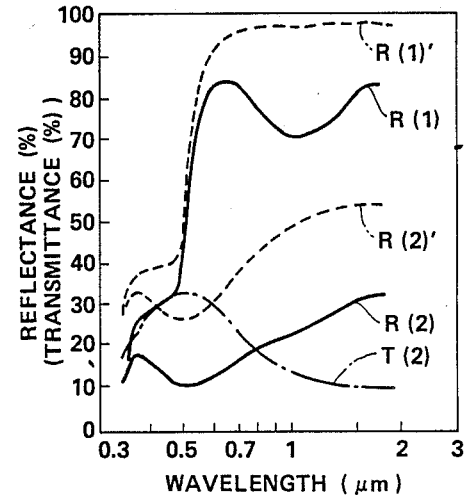
FIG. 7 is a chart showing spectral characteristics of two examples of coated glass plates not in accordance with the invention.

The thus coated glass plate did not assume a golden appearance and exhibited the spectral characteristics shown in FIG. 7, wherein the curve R(2) represent reflectance for light incident on the uncoated glass surface of the coated glass plate and the curve R(2)' reflectance for light incident on the Au coating film. The curve T(2) represents transmittance of the coated glass plate. From a comparison between these reflectance curves R(2), R(2)' and the curves R, R' in FIG. 1 (Example 1), it is understood that the addition of the overlying TiN layer 14 according to the invention produces an important effect on the spectral reflection characteristics. The sputter deposition of the single-layer coating film of TiN was repeated by widely varying the proportion of N$_2$ gas to Ar gas, but it was unsuccessful to obtain a coated glass plate of a good golden hue.

What is claimed is:

1. A coated glass plate, comprising a transparent or semitransparent glass plate and a multilayer coating film which is provided on one side of the glass plate and comprises a TiN layer adjacent to the glass plate surface and a layer of a metal selected from the group consisting of Ti and Cr which overlies said TiN layer, said multilayer coating film being formed such that the transmittance of the coated glass plate for visible light is not more than 40%.

2. A coated glass plate according to claim 1, wherein said multilayer coating film further comprises a layer of a metal oxide selected from the group consisting of TiO$_2$ and Cr$_2$O$_3$ which overlies said metal layer.

3. A coated glass plate according to claim 1, wherein said multilayer coating film further comprises a layer of a metal oxide selected from the group consisting of TiO$_2$ and Cr$_2$O$_3$ which interposes between said TiN layer and the glass plate surface.

4. A coated glass plate according to claim 1, wherein said transmittance is not more than 20%.

5. A coated glass plate according to claim 1, wherein said transparent or semitransparent glass plate is a colorless glass plate.

6. A coated glass plate according to claim 1, wherein said transparent or semitransparent glass plate is a color glass plate.

7. A coated glass plate according to claim 1, wherein each layer of said multilayer coating film is a sputter deposited film.

8. A coated glass plate according to claim 7, wherein each of said TiN layer and the layer of said metal has a thickness in the range from 100 to 2000 Å.

* * * * *